(12) United States Patent
Kim

(10) Patent No.: US 11,795,955 B2
(45) Date of Patent: Oct. 24, 2023

(54) PUMPING DEVICE FOR VEHICLE SEAT

(71) Applicant: HYUNDAI TRANSYS INCORPORATED, Seosan-si (KR)

(72) Inventor: Won Kim, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 275 days.

(21) Appl. No.: 17/354,550

(22) Filed: Jun. 22, 2021

(65) Prior Publication Data
US 2022/0099097 A1 Mar. 31, 2022

(30) Foreign Application Priority Data

Sep. 29, 2020 (KR) .......................... 10-2020-0126898

(51) Int. Cl.
*B60N 2/16* (2006.01)
*F16D 41/06* (2006.01)
(Continued)

(52) U.S. Cl.
CPC .............. *F04D 25/02* (2013.01); *B60N 2/168* (2013.01); *F04D 29/403* (2013.01); *F16D 41/06* (2013.01);
(Continued)

(58) Field of Classification Search
CPC .......................... B60N 2/165–168; B60N 2/16; B60N 2/1635; B60N 2/938; F16D 41/06–165; F16D 67/02
See application file for complete search history.

(56) References Cited

U.S. PATENT DOCUMENTS

2012/0273319 A1  11/2012  Hur et al.
2012/0279819 A1  11/2012  Kawai et al.
(Continued)

FOREIGN PATENT DOCUMENTS

CN     201342963 Y    11/2009
CN     107539171 A    1/2018
(Continued)

OTHER PUBLICATIONS

Clement Vachey, "EESR for EP Application No. 21196735.1", dated Mar. 1, 2022, EPO, Germany.

*Primary Examiner* — Ernesto A Suarez
*Assistant Examiner* — Lillian T Nguyen
(74) *Attorney, Agent, or Firm* — Bridgeway IP Law Group, PLLC; Jihuan Kim

(57) ABSTRACT

A pumping device for a vehicle seat is proposed. The pumping device includes: a housing made of plastic, including a bottom surface having a through hole, a side wall arranged along an outer circumferential surface of the bottom surface, and an open upper surface, with a clutch device and a brake device, and a lever being connected to the housing at an outside of the bottom surface through the through hole so that the housing is configured to transmit drive force from the lever to the clutch device; and a housing cover made of metal, including a first side surface covering the open upper surface of the housing, a plurality of bending parts at an edge thereof such that the bending parts are bent toward the housing to achieve coupling between the housing cover and the housing, and a second side surface coupled to a seat frame.

8 Claims, 7 Drawing Sheets

(51) Int. Cl.
F04D 25/02 (2006.01)
F04D 29/40 (2006.01)
F16D 67/02 (2006.01)

(52) U.S. Cl.
CPC ...... F16D 67/02 (2013.01); *F05D 2260/4023* (2013.01)

(56) References Cited

U.S. PATENT DOCUMENTS

| | | | |
|---|---|---|---|
| 2012/0305359 A1* | 12/2012 | Sato | B60N 2/167 |
| | | | 192/41 S |
| 2018/0001794 A1* | 1/2018 | Kim | B60N 2/168 |
| 2019/0225121 A1* | 7/2019 | Chiang | B60N 2/165 |
| 2020/0101884 A1* | 4/2020 | Navatte | B60N 2/16 |

FOREIGN PATENT DOCUMENTS

| | | |
|---|---|---|
| CN | 110001460 A | 7/2019 |
| DE | 102017206231 A1 | 1/2018 |
| KR | 10-0784620 B1 | 12/2007 |

* cited by examiner

PUMPING DEVICE FOR VEHICLE SEAT

CROSS REFERENCE TO RELATED APPLICATION

The present application claims priority to Korean Patent Application No. 10-2020-0126898, filed Sep. 29, 2020, the entire contents of which is incorporated herein for all purposes by this reference.

BACKGROUND OF THE INVENTION

Field of the Invention

The present invention relates generally to a pumping device for a vehicle seat, wherein a housing is formed of a plastic material, a housing cover is formed of a metal material, and the housing and the housing cover are coupled to each other by bending and fitting methods.

Description of the Related Art

A conventional pumping device is a device mounted to a vehicle seat so that a seat occupant adjusts the height of a seat cushion to suit his/her body. When the seat occupant controls a lever provided at a side surface of the seat cushion clockwise or counterclockwise, operation force of the lever is transmitted to a link device through the pumping device to raise or lower the seat cushion corresponding to an operated direction of the lever, so that the height of the seat cushion may be adjusted.

However, the conventional pumping device has many restrictions of shape, thereby affecting a method, mass production, etc. because almost all elements thereof are designed based on metal. In order to compensate the restrictions of shape, addition of elements or additional post-processing is required, which causes an increase in product cost. Therefore, in the current situation, popular design has been oriented to achieve cost competitiveness, and an environment in which it is difficult to adopt new ideas has been created, so development of a new pumping device compensating the problems has been required.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a pumping device for a vehicle seat, wherein a housing is made of a plastic material so as to increase a degree of freedom of shape in manufacturing the housing, a housing cover is made of a metal material, and the housing and the housing cover are coupled to each other by bending and fitting methods.

In order to achieve the above objective, according to one aspect of the present invention, there is provided a pumping device for a vehicle seat. The pumping device for a vehicle seat includes: a housing made of a plastic material, the housing including a bottom surface having a through hole, a side wall arranged along an outer circumferential surface of the bottom surface, and an open upper surface; a clutch device and a brake device seated on the clutch device, both of the clutch device and brake device disposed in the housing; a lever connected to the housing at an outside of the bottom surface through the through hole so that the housing may be configured to transmit drive force from the lever to the clutch device; and a housing cover made of a metal material, the housing cover including a first side surface covering the open upper surface of the housing, a plurality of bending parts at an edge thereof such that the bending parts may be bent toward the housing to achieve coupling between the housing cover and the housing, and a second side surface coupled to a seat frame.

The clutch device may include a clutch cam and a clutch drum, and in the inside of the housing, while the clutch drum is compressed, the brake device may be seated on an upper end of the clutch drum.

A plurality of coupling parts may be provided to be spaced apart from each other at an upper portion of the side wall of the housing, and the housing cover may be seated on the housing and the bending parts of the housing cover may be bent and inserted into the coupling parts of the housing.

Each of the coupling parts may include coupling protrusions spaced apart from each other in a lateral direction, and each of the bending parts may be inserted into a portion between the coupling protrusions spaced apart from each other while being bent and be fitted into and overlaps with the side wall of the housing.

A plurality of assembly protrusions may be provided upward on an upper end of the side wall of the housing and be spaced apart from each other and assembly grooves may be provided at the housing cover, so the housing cover may be seated on an upper end of the housing and the assembly protrusions of the housing may be inserted into the assembly grooves of the housing cover.

A plurality of downward protruding hooks may be provided at an edge of the bottom surface of the housing and be spaced apart from each other, and a lever bracket to which the lever may be mounted may be assembled to the bottom surface of the housing in such a manner that separation of the lever bracket may be prevented as an edge of the lever bracket is blocked at the hooks.

The brake device may include a brake ring having a plurality of braking protrusions protruding outward, and an upper portion of the side wall of the housing may have a plurality of insertion grooves into which the braking protrusions of the brake ring may be inserted, so the braking protrusions of the brake ring may be inserted into the insertion grooves of the housing, thereby preventing rotation of the brake ring.

The housing cover may have a plurality of holes, and the housing cover may be coupled to the seat frame by using the plurality of holes through a manner including bolting or riveting when being coupled to the seat frame.

The bottom surface of the housing may include a first surface surrounding the through hole and a second surface protruding from the first surface toward the clutch device and surrounding the first surface, and the clutch device may include a clutch cam and a clutch drum, wherein the clutch cam may be supported by the first surface and the clutch drum may be supported by the second surface.

According to the present invention, the pumping device for a vehicle seat is configured such that the housing is made of a plastic material so as to increase a degree of freedom of shape in manufacturing the housing and to easily and efficiently manufacture the housings for various types of vehicles, the housing cover is made of a metal material, and the housing and the housing cover can be coupled to each other by bending and fitting methods.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
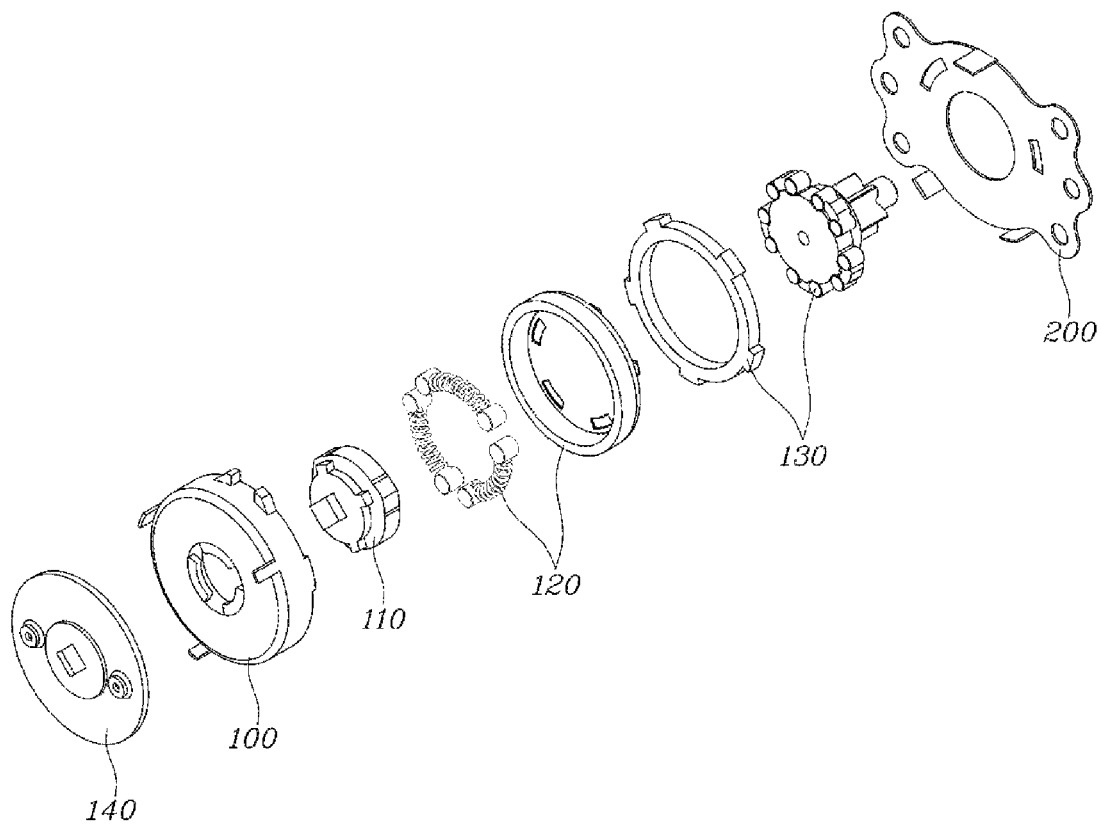
FIG. 1 is an exploded perspective view showing a pumping device for a vehicle seat according to an embodiment of the present invention.
Figure 2:
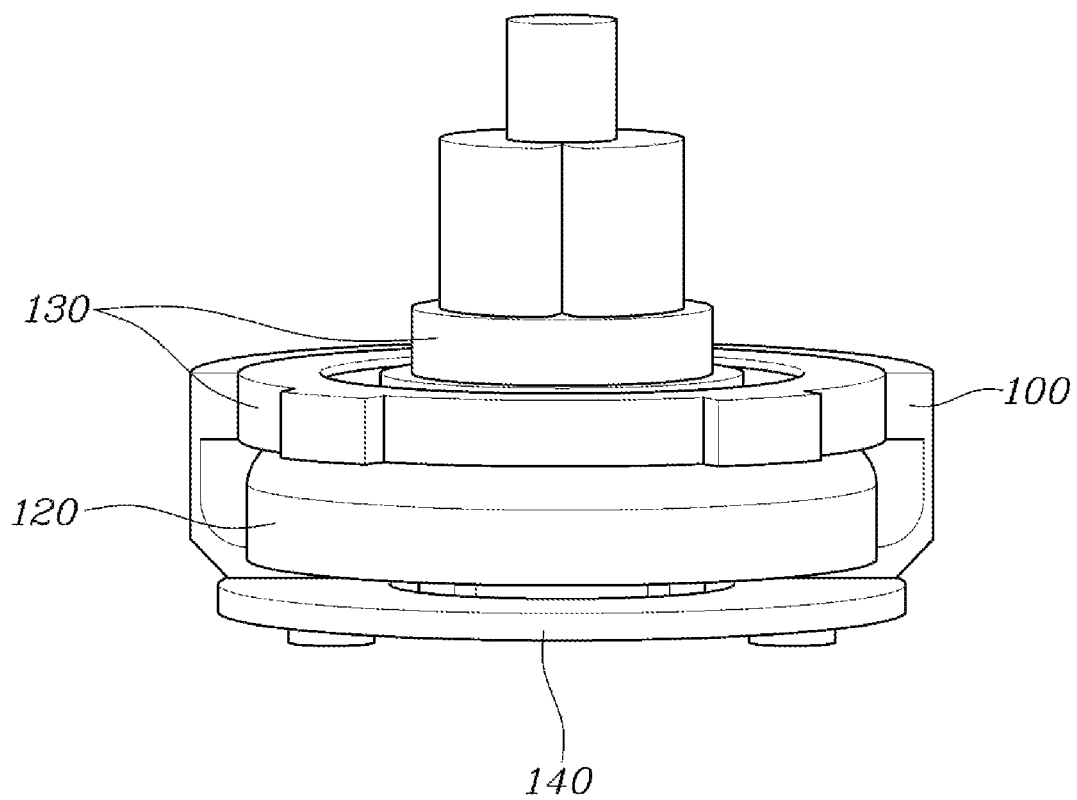
FIG. 2 is a view showing the inside of a housing in which a clutch device and a brake device seated on each other, in the pumping device for a vehicle seat according to the embodiment of the present invention.
Figure 3:
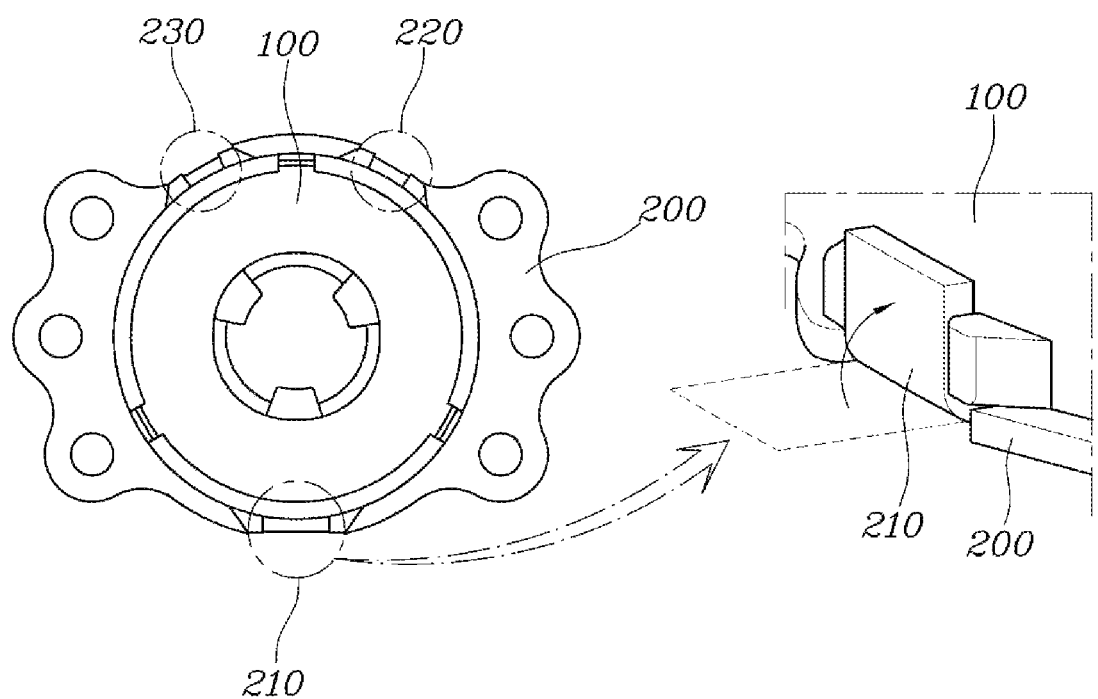
FIG. 3 is a view showing the housing cover in which bending parts thereof are coupled to coupling parts of the housing in the insertion manner, in the pumping device for a vehicle seat according to the embodiment of the present invention.
Figure 4:
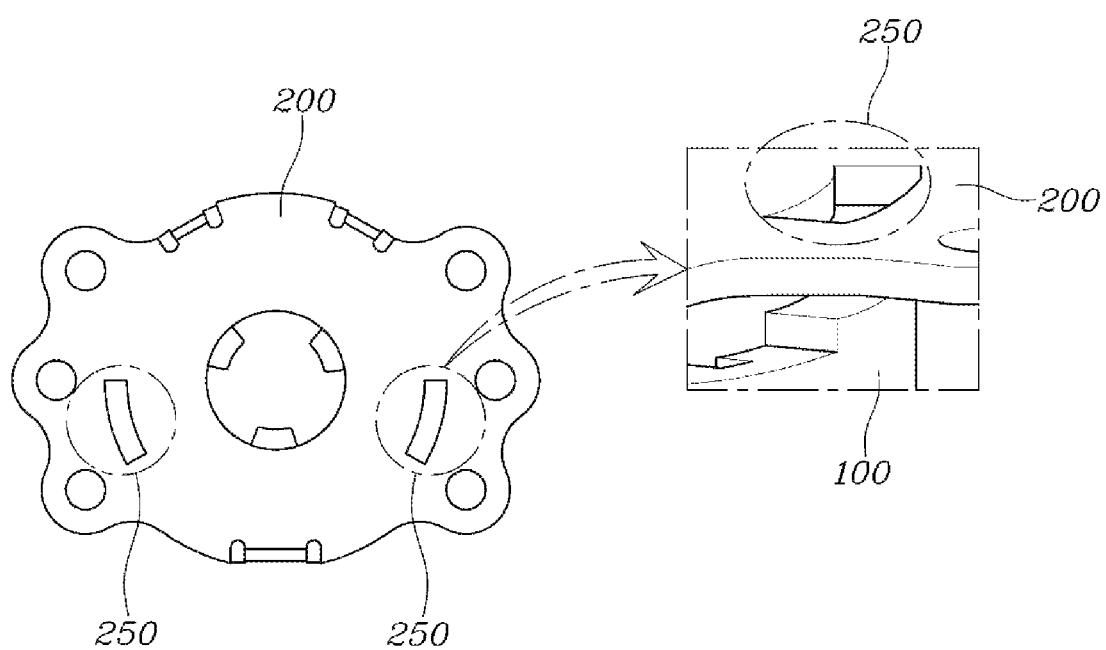
FIG. 4 is a view showing the housing in which assembly protrusions thereof are coupled to assembly grooves of the housing cover in the insertion manner, in the pumping device for a vehicle seat according to the embodiment of the present invention.
Figure 5:
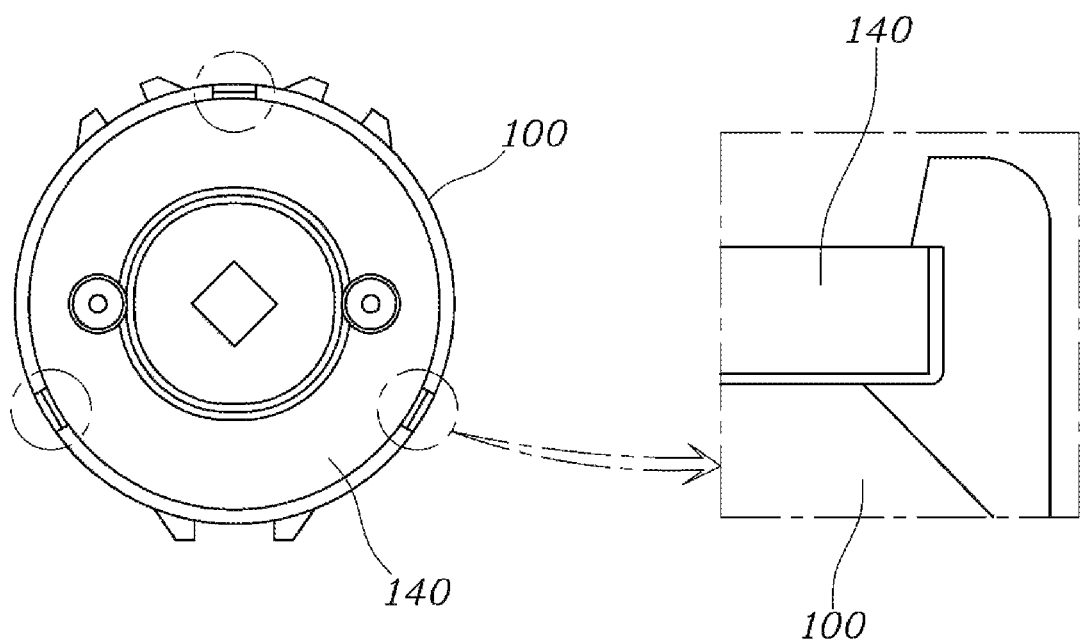
FIG. 5 is a view showing a lever bracket assembled by being blocked at a hook of the housing, in the pumping device for a vehicle seat according to the embodiment of the present invention.
Figure 6:
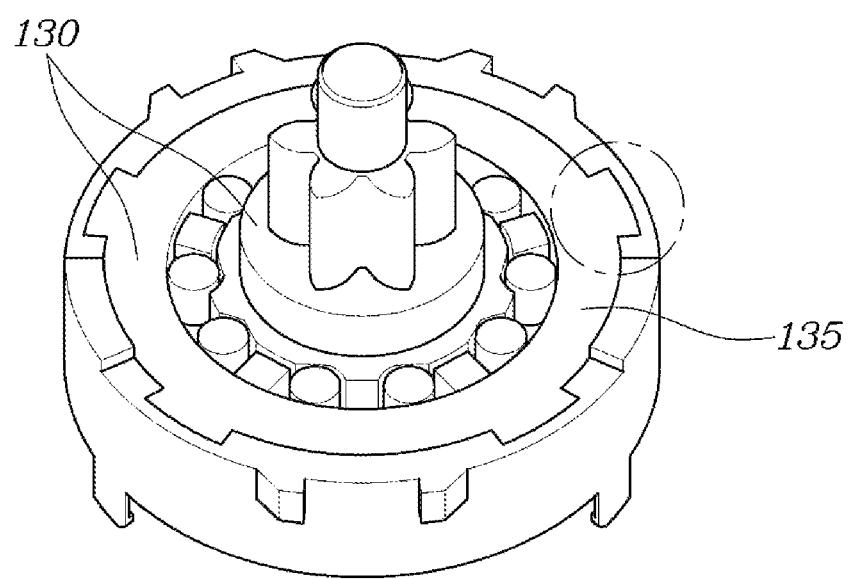
FIG. 6 is a view showing an assembly of the brake device and the housing, in the pumping device for a vehicle seat according to the embodiment of the present invention.
Figure 7:
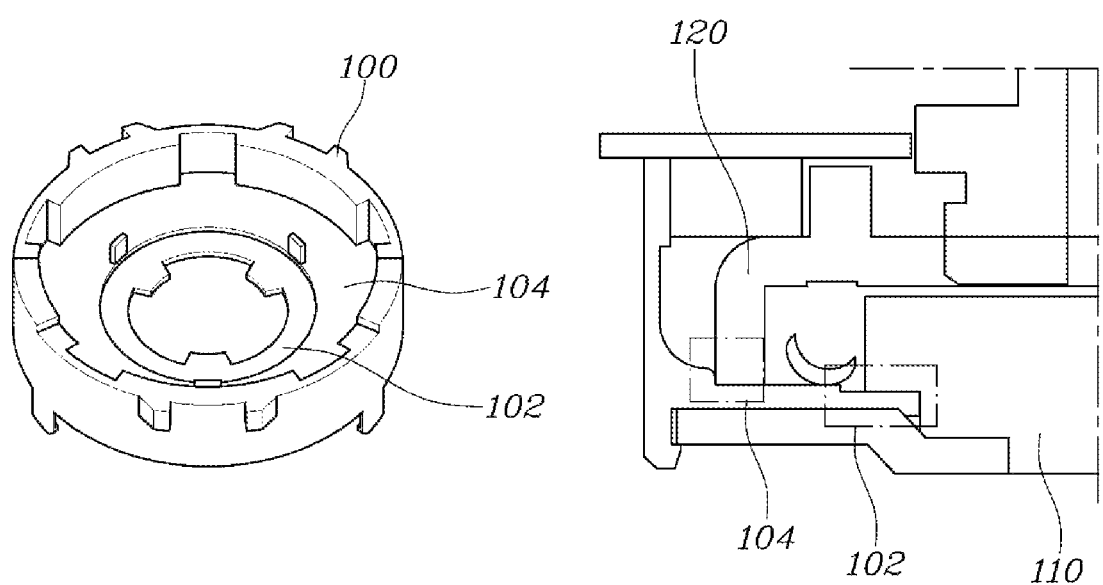
FIG. 7 is a view showing a bottom surface in the housing, in the pumping device for a vehicle seat according to the embodiment of the present invention.

FIG. 1 is an exploded perspective view showing a pumping device for a vehicle seat according to an embodiment of the present invention. FIG. 2 is a view showing the inside of a housing in which a clutch device and a brake device seated on each other, in the pumping device for a vehicle seat according to the embodiment of the present invention. FIG. 3 is a view showing the housing cover in which bending parts thereof are coupled to coupling parts of the housing in the insertion manner, in the pumping device for a vehicle seat according to the embodiment of the present invention. FIG. 4 is a view showing the housing in which assembly protrusions thereof are coupled to assembly grooves of the housing cover in the insertion manner, in the pumping device for a vehicle seat according to the embodiment of the present invention. FIG. 5 is a view showing a lever bracket assembled by being blocked at a hook of the housing, in the pumping device for a vehicle seat according to the embodiment of the present invention. FIG. 6 is a view showing an assembly of the brake device and the housing, in the pumping device for a vehicle seat according to the embodiment of the present invention. FIG. 7 is a view showing a bottom surface in the housing, in the pumping device for a vehicle seat according to the embodiment of the present invention.

As shown in FIG. 1 that is an exploded perspective view showing the pumping device for a vehicle seat according to an embodiment of the present invention and in FIG. 2 that is a view showing the inside of the housing in which the clutch device and the brake device seated on each other, in the pumping device for a vehicle seat according to the embodiment of the present invention, the pumping device for a vehicle seat includes: a housing 100 made of a plastic material, having a bottom surface with a through hole, a side wall arranged along an outer circumferential surface of the bottom surface, and an open upper surface, with a clutch device 110, 120 and the brake device 130, both of which are seated on each other being received in the housing, and a lever being connected to the housing at the outside of the bottom surface through the through hole so that the housing is configured to transmit drive force from the lever to the clutch device; and a housing cover 200 made of a metal material, having a first side surface covering the open upper surface of the housing 100, a plurality of bending parts at an edge thereof such that the bending parts are bent toward the housing 100 thereby coupling the housing cover to the housing 100, and a second side surface coupled to a seat frame.

A housing of a conventional pumping device for a vehicle seat is formed such that a cylindrical drawing part is formed by the press method and elements thereof are assembled by being only layered in the drawing part. According to the embodiment of the present invention, the pumping device for a vehicle seat may be formed by injection molding because the housing 100 is made of a plastic material unlike the housing of the conventional pumping device. As the plastic housing 100 is formed by injection molding, the housing has a high degree of freedom of shape, so the housing 100 may have various shapes at outer and inner portions suitable for elements opposed the outer and inner portions of the housing 100.

In the pumping device for a vehicle seat according to the embodiment of the present invention, the clutch device 110, 120 includes a clutch cam 110 and a clutch drum 120, and the clutch drum 120 is pressed in the inside space of the housing 100 and the brake device 130 may be seated on an upper end of the clutch drum 120. In detail, a lever bracket 140 is assembled at an outer surface of the housing 100, and the clutch cam 110 and the clutch drum 120 are assembled to the bottom surface in the inside space of the housing 100. After the brake device 130 is seated on the upper end of the clutch drum 120, the housing cover 200 is coupled to the housing 100. As the plastic housing 100 is formed by injection molding, the shape capable of guiding a rotation radius of an internal element that has the same shaft as the housing 100 in the inside space of the housing 100 is reflected to assist stable operation of the pumping device, and the brake device is assembled to enable the brake operation to be performed. As the housing replaces a function of another element, the shape of the another element may be simplified or removed, so the housing 100 may be advantageous in terms of quality control for single products.

Meanwhile, according to the embodiment of the present invention, the housing cover 200 has a plurality of holes in the pumping device for a vehicle seat, and the housing cover 200 may be coupled to the seat frame by using the plurality of holes by a coupling method including bolting or riveting. After the housing 100 and the housing cover 200 are coupled to each other, the housing cover 200 is coupled to the seat frame, and a seat occupant may adjust the height of a seat cushion by controlling the lever coupled to the lever bracket 140 at the outside surface of the housing 100.

FIG. 3 is a view showing the housing cover in which bending parts thereof are coupled to coupling parts of the housing in the insertion manner, in the pumping device for a vehicle seat according to the embodiment of the present invention. In the pumping device for a vehicle seat according to the embodiment of the present invention, a plurality of coupling parts is provided to be spaced apart from each other at an upper portion of the side wall of the housing 100. The housing cover 200 is seated on an upper end of the housing 100, and the bending parts 210, 220, and 230 of the housing cover 200 are bent, so that the bending parts may be inserted into the coupling parts of the housing 100. In the pumping device for a vehicle seat according to the embodiment of the present invention, each of the coupling parts includes coupling protrusions that are spaced apart from each other in a lateral direction, and each of the bending parts 210, 220, and 230 is inserted into a portion between the coupling protrusions spaced each other while being bent and is fitted into and overlaps with the side wall of the housing 100.

As the housing 100 is made of a plastic material, the bending parts 210, 220, and 230 of the metal housing cover 200 are bent and inserted into portions between the coupling protrusions of the coupling parts, and are fitted into and overlap with the side wall of the housing, so that the housing 100 and the housing cover 200 may be coupled to each other. As the present invention adopts the above coupling method, size management for each element may be easy.

FIG. 4 is a view showing the housing in which assembly protrusions thereof are coupled to assembly grooves of the housing cover in the insertion manner, in the pumping device for a vehicle seat according to the embodiment of the present invention. In the pumping device for a vehicle seat according to the embodiment of the present invention, a plurality of protrusions is provided upward on an upper end of the side wall of the housing 100 and is spaced apart from each other, and the assembly grooves 250 are provided at the housing cover 200, so the housing cover 200 is seated on the upper end of the housing 100 and the assembly protrusions of the housing 100 are inserted into the assembly grooves 250 of the housing cover 200. The housing cover 200 is completely restrained to the housing 100, such that the assembly protrusions of the housing 100 are firstly inserted into the assembly grooves 250 of the housing cover 200 and then bending coupling of the bending parts 210, 220, and 230 of the housing cover 200 are performed. Even when assembly is performed at difference locations, the housing cover and the housing are assembled with each other by the same process as the above process, and only locations or shapes of the assembly grooves 250 of the housing cover 200 are modified.

FIG. 5 is a view showing a lever bracket assembled by being blocked at a hook of the housing, in the pumping device for a vehicle seat according to the embodiment of the present invention. In the pumping device for a vehicle seat according to the embodiment of the present invention, a plurality of protruding hooks is provided downward at an edge of the bottom surface of the housing 100 and is spaced apart from each other, and the lever bracket 140 to which the lever is mounted is assembled to the bottom surface of the housing 100 in such a manner that separation of the lever bracket 140 is prevented as an edge thereof is blocked at the hooks. Primary assembly of the lever bracket 140 is performed such that the lever bracket 140 pushes outward the hooks of the housing 100 during assembly, so primary assembly performance thereof is excellent. When the pumping device is operated after the assembly, the lever bracket 140 is restrained by the plurality of hooks at the outermost portion of the housing 100, so that a clearance generated when the lever bracket 140 moves in the lateral direction may be minimized. The minimization of clearance is one of important factors that convey a sense of stability and luxury to occupants. In addition, the housing 100 is made of a plastic material, so that there may be no concerns of joints during friction.

FIG. 6 is a view showing an assembly of the brake device and the housing, in the pumping device for a vehicle seat according to the embodiment of the present invention. according to the embodiment of the present invention, the brake device 130 of the pumping device for a vehicle seat includes a brake ring 135 having a plurality of braking protrusions protruding outward, and the upper portion of the side wall of the housing 100 has a plurality of insertion grooves into which the braking protrusions of the brake ring 135 may be inserted, so the braking protrusions of the brake ring 135 are inserted into the insertion grooves of the housing 100, thereby preventing the rotation of the brake ring 135. The brake ring 135 is completely restrained by being coupled to a plurality of grooves in the housing 100. In particular, inner diameter management is important in the brake ring 135, and the shape becomes simple and the thickness becomes thick in the present invention, so fine management is possible and thus the present invention has an advantageous condition in functional and cost aspects.

FIG. 7 is a view showing a bottom surface in the housing, in the pumping device for a vehicle seat according to the embodiment of the present invention. In the pumping device for a vehicle seat according to the embodiment of the present invention, the bottom surface of the housing 100 includes a first surface 102 surrounding the through hole and a second surface 104 protruding from the first surface 102 toward the clutch device 110, 120 and surrounding the first surface 102, and the clutch device 110, 120 includes the clutch cam 110 and the clutch drum 120, and the clutch cam 110 is supported by the first surface 102 and the clutch drum 120 may be supported by the second surface 104. A biggest advantage of forming the plastic housing 100 by injection molding is that a degree of freedom of shape is high. The pumping device is operated most like designer's intention when all elements rotate close to a concentric shaft of the pumping device. Therefore, a multiple stepped shape is provided inside the housing 100 that may assist the concentricity of each element to a predetermined amount or less centered on the through hole. In addition, various shapes may be reflected to assist the efficient operation of the pumping device, and the joint due to friction during the operation of the pumping device may be minimized so that a sense of operation stability may be secured. The plastic housing 100 is formed by injection molding, so that the complex shaped of the housing may be easily formed, so the clutch cam 110 and the clutch drum 120 are easily assembled by being supported to the first surface 102 and the second surface 104 centered on the through hole of the housing 100, and operation stability of the pumping device may be improved.

The pumping device for a vehicle seat according to the embodiment of the present invention has following advantages. The plastic housing 100 is formed by injection molding so that a degree of freedom in shapes of the housing 100 and the housing cover 200 is increased, the housing 100 is simplified and only the housing cover 200 is replaced so that the pumping device may correspond to each OEM and types of vehicles, the shape of other elements of the housing 100 is simplified so that mass production and ease of management are increased, and the weight of the housing 100 is lighter than the weight of a metal material so that lightening of the pumping device may be realized.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A pumping device for a vehicle seat, the pumping device comprising:
    a housing made of a plastic material, the housing comprising a bottom surface having a through hole, a side wall arranged along an outer circumferential surface of the bottom surface, and an open upper surface;
    a clutch device and a brake device seated on the clutch device, both of the clutch device and the brake device being disposed in the housing;
    a lever connected to the housing at an outside of the bottom surface through the through hole so that the housing is configured to transmit drive force from the lever to the clutch device; and
    a housing cover made of a metal material, the housing cover comprising a first side surface covering the open upper surface of the housing, a plurality of bending parts at an edge thereof such that the bending parts are bent toward the housing to achieve coupling between the housing cover and the housing, and a second side surface coupled to a seat frame,
    wherein a plurality of assembly protrusions are disposed upward on an upper end of the side wall of the housing and are spaced apart from each other and assembly grooves are disposed at the housing cover, and wherein the housing cover is seated on an upper end of the housing and the assembly protrusions of the housing are inserted into the assembly grooves of the housing cover.

2. The pumping device of claim 1, wherein the clutch device comprises a clutch cam and a clutch drum disposed inside the housing, the clutch drum is configured to be compressed, and the brake device is seated on an upper end of the clutch drum.

3. The pumping device of claim 1, wherein the housing includes a plurality of coupling parts spaced apart from each other at an upper portion of the side wall of the housing, and the housing cover is seated on the housing and the bending parts of the housing cover are bent and inserted into the coupling parts of the housing.

4. The pumping device of claim 3, wherein each of the coupling parts comprises coupling protrusions spaced apart from each other in a lateral direction, and each of the bending parts is inserted into a portion between the coupling protrusions spaced apart from each other while being bent and is fitted into and overlaps with the side wall of the housing.

5. The pumping device of claim 1, wherein the housing cover has a plurality of holes, and the housing cover is coupled to the seat frame by using the plurality of holes through a manner including bolting or riveting when being coupled to the seat frame.

6. The pumping device of claim 1, wherein the bottom surface of the housing comprises a first surface surrounding the through hole and a second surface protruding from the first surface toward the clutch device and surrounding the first surface, and the clutch device comprises a clutch cam and a clutch drum, wherein the clutch cam is supported by the first surface and the clutch drum is supported by the second surface.

7. A pumping device for a vehicle seat, the pumping device comprising:
    a housing made of a plastic material, the housing comprising a bottom surface having a through hole, a side wall arranged along an outer circumferential surface of the bottom surface, and an open upper surface;
    a clutch device and a brake device seated on the clutch device, both of the clutch device and the brake device being disposed in the housing;
    a lever connected to the housing at an outside of the bottom surface through the through hole so that the housing is configured to transmit drive force from the lever to the clutch device; and
    a housing cover made of a metal material, the housing cover comprising a first side surface covering the open upper surface of the housing, a plurality of bending parts at an edge thereof such that the bending parts are bent toward the housing to achieve coupling between the housing cover and the housing, and a second side surface coupled to a seat frame,
    wherein a plurality of downward protruding hooks are disposed at an edge of the bottom surface of the housing and are spaced apart from each other, and a lever bracket to which the lever is mounted is assembled to the bottom surface of the housing in such a manner that separation of the lever bracket is prevented as an edge of the lever bracket is blocked at the hooks.

8. A pumping device for a vehicle seat, the pumping device comprising:
    a housing made of a plastic material, the housing comprising a bottom surface having a through hole, a side wall arranged along an outer circumferential surface of the bottom surface, and an open upper surface;
    a clutch device and a brake device seated on the clutch device, both of the clutch device and the brake device being disposed in the housing;
    a lever connected to the housing at an outside of the bottom surface through the through hole so that the housing is configured to transmit drive force from the lever to the clutch device; and
    a housing cover made of a metal material, the housing cover comprising a first side surface covering the open upper surface of the housing, a plurality of bending parts at an edge thereof such that the bending parts are bent toward the housing to achieve coupling between the housing cover and the housing, and a second side surface coupled to a seat frame,
    wherein the brake device comprises a brake ring having a plurality of braking protrusions protruding outward, and an upper portion of the side wall of the housing has a plurality of insertion grooves into which the braking protrusions of the brake ring are inserted, such that the braking protrusions of the brake ring are inserted into the insertion grooves of the housing, thereby preventing rotation of the brake ring.

\* \* \* \* \*